United States Patent
Liljenberg et al.

(10) Patent No.: US 12,435,669 B1
(45) Date of Patent: Oct. 7, 2025

(54) ELECTROSTATIC FLOW GUIDE DIRT COLLECTOR

(71) Applicant: RTX Corporation, Farmington, CT (US)

(72) Inventors: Scott Liljenberg, Wethersfield, CT (US); Dustin Davis, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/800,860

(22) Filed: Aug. 12, 2024

(51) Int. Cl.
| | |
|---|---|
| F02C 7/052 | (2006.01) |
| B03C 3/017 | (2006.01) |
| B03C 3/36 | (2006.01) |
| B03C 3/45 | (2006.01) |
| B03C 3/70 | (2006.01) |
| B03C 3/86 | (2006.01) |
| F23R 3/42 | (2006.01) |

(52) U.S. Cl.
CPC .............. *F02C 7/052* (2013.01); *B03C 3/017* (2013.01); *B03C 3/366* (2013.01); *B03C 3/45* (2013.01); *B03C 3/70* (2013.01); *B03C 3/86* (2013.01); *F23R 3/42* (2013.01)

(58) Field of Classification Search
CPC ......... F02C 7/052; B03C 3/017; B03C 3/366; B03C 3/45; B03C 3/70; B03C 3/86; F23R 3/42
See application file for complete search history.

(56) References Cited

U.S. PATENT DOCUMENTS

| | | | | |
|---|---|---|---|---|
| 5,695,328 A | * | 12/1997 | DeFreitas | F02C 7/264 431/258 |
| 10,767,512 B2 | | 9/2020 | Paillard et al. | |
| 11,555,447 B1 | | 1/2023 | Jupudi et al. | |
| 2001/0045474 A1 | * | 11/2001 | Wilbraham | F23R 3/286 239/690 |
| 2011/0179763 A1 | * | 7/2011 | Rajamani | F04D 29/701 60/39.092 |

* cited by examiner

*Primary Examiner* — Steven M Sutherland
(74) *Attorney, Agent, or Firm* — Kinney & Lange, P.A.

(57) ABSTRACT

A gas turbine engine combustor section extends axially from a pre-diffuser at a forward end to an aft end relative to an engine axis. The gas turbine engine combustor section includes a combustor liner defining a combustion chamber and a combustor dome situated at a forward end of the combustor liner and affixed thereto. The gas turbine engine combustor section further includes an electrostatic particulate matter collector. The electrostatic particulate matter collector includes a first charged flow guide having an axially forward-most extent aligned with the pre-diffuser and widens radially with respect to the engine axis from the forward-most extent to the combustor dome. The electrostatic particulate matter collector further includes a fuel nozzle extending through the first charged flow guide into the combustor dome. The electrostatic particulate matter collector also includes a power supply electrically coupled to positively charge the first charged flow guide.

20 Claims, 4 Drawing Sheets

ELECTROSTATIC FLOW GUIDE DIRT COLLECTOR

BACKGROUND

The present disclosure relates generally to turbomachines used in aircraft. More particularly, it relates to structures capable of preventing particulate matter from entering a combustor and turbine using a particulate matter collection device.

Environmental air ingested by turbomachines can contain dirt and other unwanted particulate matter. When this particulate matter reaches the combustor section, it can clog cooling passages such as combustor liner dilution holes, thus inhibiting the free flow of air into the combustion chamber and impairing cooling. Furthermore, particulate matter in the combustor section can damage or degrade coatings/materials and diminish heat rejection of various components. Moreover, heat exacerbates the adhesion of particulate matter to sections of components, exacerbating or accelerating loss of cooling. As a result, particulate matter negatively impacts the performance of a turbomachine, reducing part lifetimes and increasing maintenance costs and downtime.

SUMMARY

One embodiment of the present invention includes a gas turbine engine combustor section that extends axially from a pre-diffuser at a forward end to an aft end relative to an engine axis. The gas turbine engine combustor section includes a combustor liner, a combustor dome, an electrostatic particulate matter collector, a fuel nozzle, and a power supply. The combustor liner defines a combustion chamber. The combustor dome is situated at a forward end of the combustor liner and is affixed thereto. The electrostatic particulate matter collector includes a first charged flow guide. The first charged flow guide has an axially forward-most extent aligned with the pre-diffuser and widens radially, with respect to the engine axis, from the forward-most extent to the combustor dome.

Another embodiment of the present invention includes an electrostatic particulate matter collector for retaining particulate matter along a flow path between a pre-diffuser and a combustor liner of a gas turbine engine combustor section. The electrostatic particulate matter collector includes a first charged flow guide, a power supply, a hole in the first charged flow guide, and a mounting system. The first charged flow guide widens radially from an upstream extent to a downstream extent, relative to the flow path. The power supply is electrically coupled to the first charged flow guide such that the first charged flow guide is able to be positively charged by the power supply. The hole in the first charged flow guide is configured to allow a fuel nozzle to pass through. The mounting system is configured to electrically isolate the first charged flow guide from, but structurally secure the first charged flow guide to the combustor liner.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents an electrostatic particulate matter collector configured to capture dirt and particulate matter disposed in a combustor section of a gas turbine engine. Particulate matter flowing out of a compressor in a gas turbine engine is negatively charged, thus allowing positively charged metal flow guides disposed upstream a combustor liner to trap and collect the particulate matter. As a result, the electrostatic particulate matter collector reduces the quantity of particulate matter reaching a combustor and turbine, more specifically, combustor cooling holes, thereby preventing or reducing particulate-related damage and cooling degradation.

Figure 1:
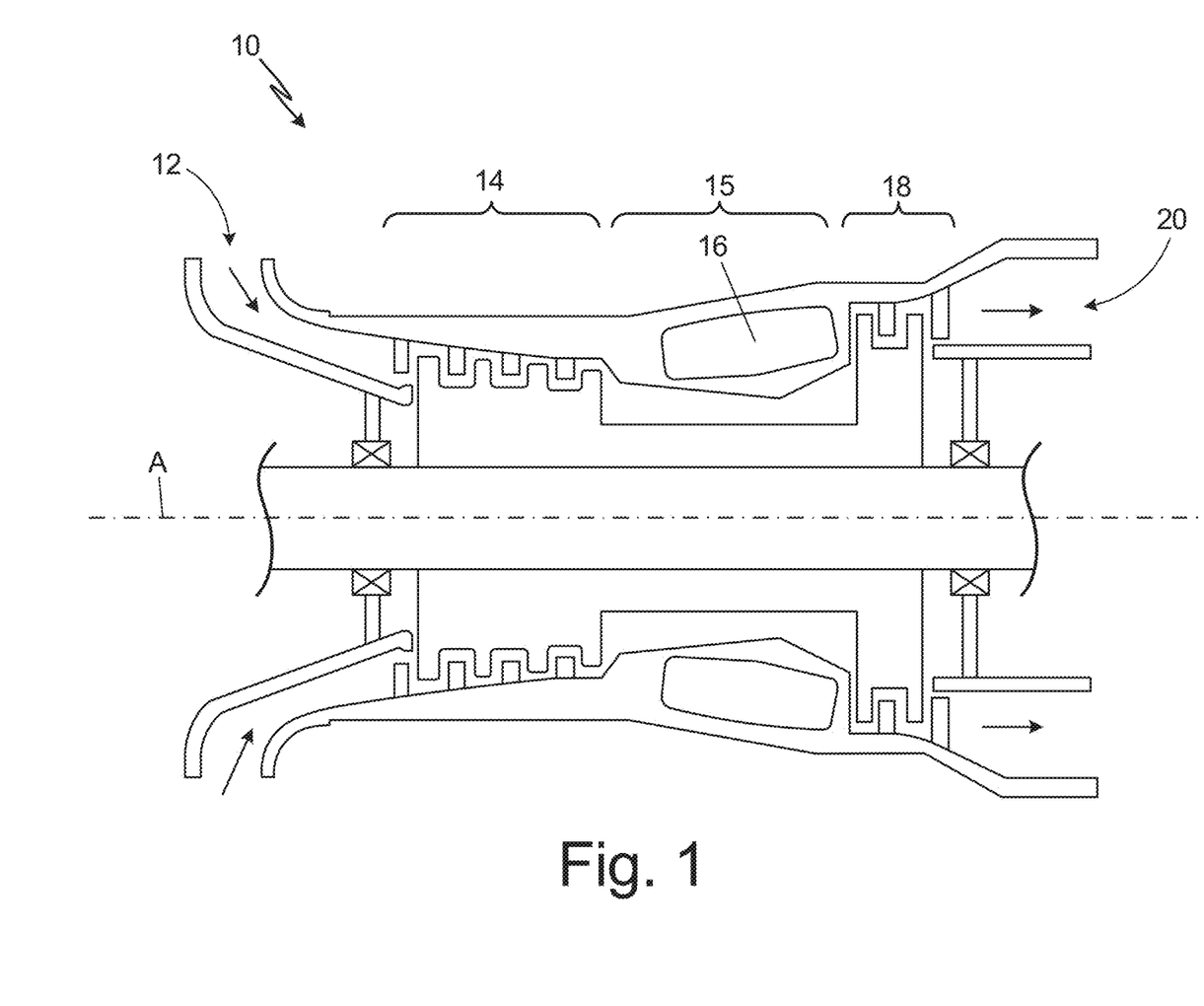
FIG. 1 is a schematic cross-sectional view of a gas turbine engine.

FIG. 1 is a schematic cross-sectional view providing a simplified illustration of gas turbine engine 10. Gas turbine engine 10 is a Brayton-cycle gas turbine engine such as an aircraft engine with air inlet 12, compressor section 14, combustor section 15, combustor 16, turbine section 18, and exhaust section 20, all oriented generally sequentially along from forward to aft along engine axis A. Gas turbine engine 10 receives environmental air via air inlet 12 and compresses this air through multiple stages of compressor rotors and stators in compressor section 14. As noted above, air in some environments can contain high concentrations of dirt or other particulate matter that can cause damage and impair cooling if allowed to reach components of combustor 16. Particulate matter is negatively charged by passage through compressor section 14, as known in the art. Compressed air from compressor section 14 then enters combustor section 15 and is mixed with fuel in combustor 16, and the resulting fuel-air mixture is ignited. Multiple stages of airfoils in turbine section 18 extract energy (via torque) from resulting high pressure combustion gasses before these gasses are expelled via exhaust section 20.

Gas turbine engine 10 provides one simplified example of a gas turbine engine to contextualize further discussion, below. The illustrated features of gas turbine engine 10 should not be understood as limiting. FIG. 1 illustrates gas turbine engine 10 with a single-spool architecture, for example, whereby a single turbine section drives a single compressor section. In other examples, however, gas turbine engine 10 can be a multi-spool (e.g., 2-spool or 3-spool) system with multiple mechanically separate stages of compressor and/or turbine. Gas turbine engine 10 can, for example, be an aircraft or industrial gas turbine engine.

Figure 2:
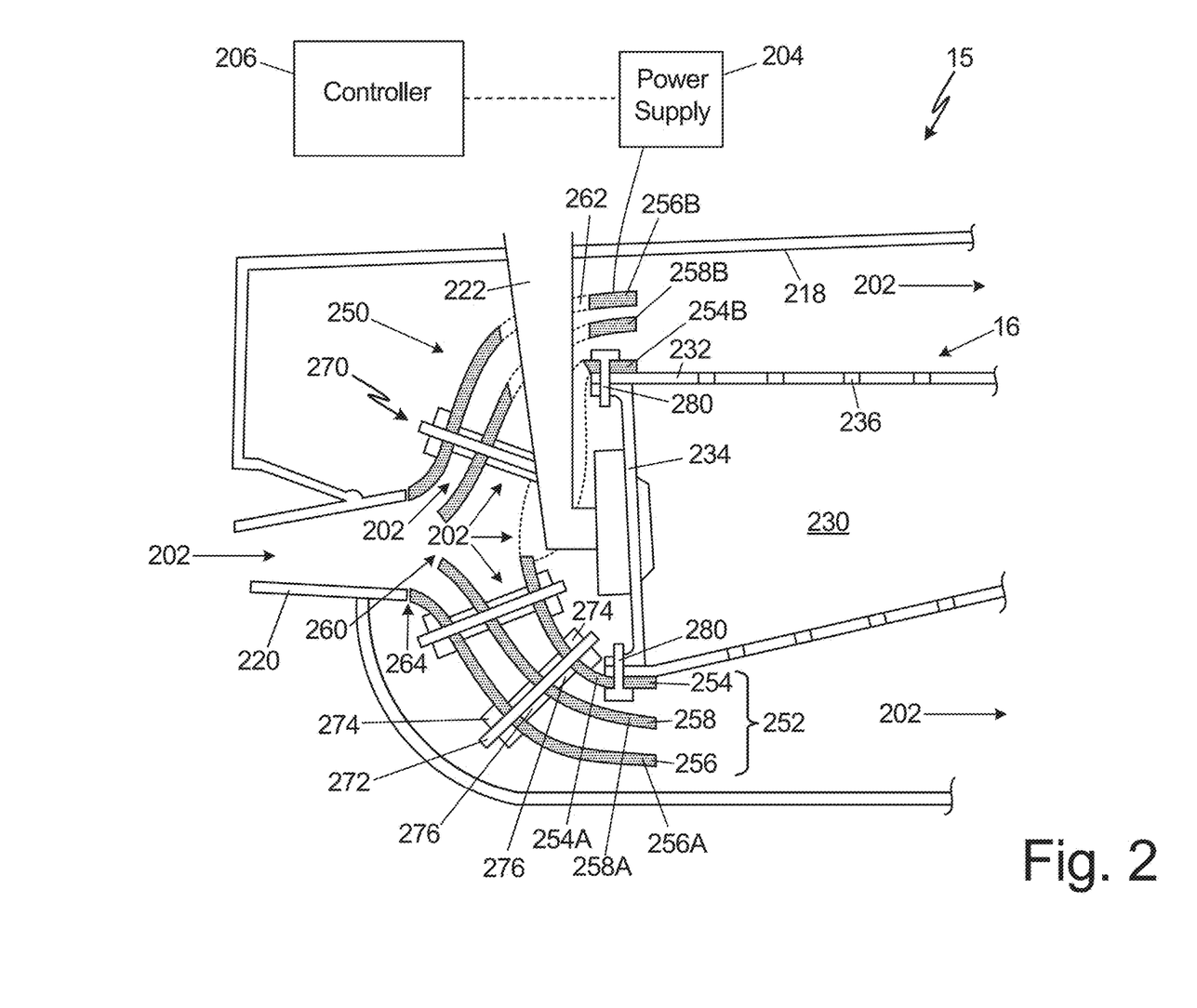
FIG. 2 is a schematic cross-sectional view of a combustor section of the gas turbine engine of FIG. 1, with an electrostatic particulate matter collector installed forward of a combustor dome and liner.

FIG. 2 is a simplified schematic cross-sectional view of combustor section 15 of gas turbine engine 10 with an electrostatic particulate matter collector 250 installed. Combustor section 15 is defined by an outer casing 218. From a forward or upstream end to an aft or downstream end following engine axis A, combustor section 15 notably includes a pre-diffuser 220, the electrostatic particulate matter collector 250, a fuel nozzle 222, and combustor 16. Combustor 16 comprises a combustor chamber 230 defined by a combustor liner 232 with holes 236 and a combustor dome 234 at a forward-most edge of the combustor chamber 230. Electrostatic particulate matter collector 250 includes charged flow guides 252, flow guide supports 270, and a mounting system 280. In the present embodiment, charged flow guides 252 can include a first charged flow guide 254, a second charged flow guide 256, and a third charged flow guide 258, each made of electrically conductive materials.

The charged flow guides 252 can be annular bodies disposed about engine axis A and configured to surround and define a combustor hood. First charged flow guide 254 has an inner diameter portion 254A and an outer diameter portion 254B. Second charged flow guide 256 has an inner diameter portion 256A and an outer diameter portion 256B. Third charged flow guide 258 has an inner diameter portion 258A and an outer diameter portion 258B. As the charged flow guides extend towards the aft end of engine axis A, the outer diameter portions 254B, 256B, and 258B radially widen relative to engine axis A, and the inner diameter portions 254A, 256A, and 258A radially decrease relative to engine axis A. As a result, the distance between the inner diameter portions 254A, 256A, and 258A and the outer diameter portions 254B, 256B, and 258B increases extending in a forward to aft direction along the engine axis A to accommodate the combustor 16 therebetween.

The charged flow guides 252 can be arranged in a nested configuration with first charged flow guide 254 received in third charged flow guide 258 and third charged flow guide 258 received in second charged flow guide 256. Second charged flow guide 256 is radially wider than third charged flow guide 258 and first charged flow guide 254. Third charged flow guide 258 is radially wider than first charged flow guide 254. The inner diameter portion 254A of first charged flow guide 254 is disposed further from the engine axis A than each of the inner diameter portions 256A and 258A of the second and third charged flow guides 256 and 258, respectively. The outer diameter portion 254B of first charged flow guide 254 is disposed closer to the engine axis than each of the outer diameter portions 256B and 258B of the second and third charged flow guides 256 and 258, respectively. As arranged, first charged flow guide 254 is the smallest and innermost-nested charged flow guide relative to engine axis A. The inner diameter portion 256 of the second charged flow guide 256 is disposed closer to the engine axis than each of the inner diameter portions 254A and 258A of first and third charged flow guides 254 and 258, respectively. The outer diameter portion 256B of second charged flow guide 256 is disposed further from the engine axis than each of the outer diameter portions 254B and 258B of the first and third charged flow guides 254 and 258, respectively. As arranged, the second charged flow guide 256 is the largest and outermost-nested charged flow guide relative to engine axis A. Third charged flow guide 258 has inner diameter portion 258A disposed between inner diameter portions 254A and 256A relative to engine axis A and outer diameter portion 258B is disposed between outer diameter portions 254B and 256B relative to engine axis A. As arranged, the third charged flow guide 258 has a size that is in between first charged flow guide 254 and second charged flow guide 256, making the third charged flow guide 258 the middle-nested charged flow guide relative to engine axis A.

First charged flow guide 254 can have an axially forward-most extent aligned with the pre-diffuser 220 and can extend to cover combustor dome 234 and at least partially overlap forward ends of combustor liner 232, forming the combustor hood. Second charged flow guide 256 can extend axially forward of first charged flow guide 254 with an axially forward edge 264 aligned with but not abutting the pre-diffuser 220, such that an electrically isolating air gap is formed therebetween. Third charged flow guide 258 can be situated between and spaced apart from each of first charged flow guide 254 and second charged flow guide 256 to allow air to between pass first charged flow guide 254 and third charged flow guide 258 and between third charged flow guide 258 and second charged flow guide 256. Third charged flow guide 258 can have an axially forward-most extent disposed between the forward-most extents of first charged flow guide 254 and second charged flow guide 256.

Charged flow guides 252 can have an annular hole 260 following the circumference of the charged flow guides 252 on a forward-most edge and between inner diameter portions 254A, 256A, and 256A and outer diameter portions 254B, 256B, and 258B. Annular hole 260 serves to allow air to pass through the charged flow guides 252. Charged flow guides 252 can have a fuel nozzle hole 262 to allow fuel nozzle 222 to extend through the charged flow guides 252 and into combustor dome 234. Fuel nozzle hole 262 can be wide enough to allow for an air gap to be formed between the charged flow guides 252 and the fuel nozzle 222 for electrical isolation. Charged flow guides 252 can have a plurality of fuel nozzle holes 262 disposed about engine axis A to accommodate a plurality of fuel nozzles 222. In the present embodiment, fuel nozzle hole 262 and the annular hole 260 of first charged flow guide 254 can be the same hole. In other embodiments, these holes might be separate and distinct from one another. Other holes in the flow guides are contemplated to allow for other components to extend through the charged flow guides 252.

Combustor liner 232 can support electrostatic particulate matter collector 250 via a portion of first charged flow guide 254 concentric with and anchored to at least one of combustor liner 232 and combustor dome 234. First charged flow guide 254 can be structurally connected to and supported by combustor liner 232 and combustor dome 234 via mounting system 280. Mounting system 280 can include a plurality of fasteners 302 (shown in FIG. 3) distributed radially around engine axis A. Any number of fasteners 302 may be used to fix first charged flow guide 254 to the combustor dome 234 and/or combustor liner 232. Mounting system 280 is configured to electrically isolate charged flow guides 252 from the rest of the combustor section, including combustor dome 234 and combustor liner 232.

Third charged flow guide 258 and second charged flow guide 256 are structurally supported by flow guide supports 270 relative to first charged flow guide 254. Flow guide supports 270 can be dispersed circumferentially around charged flow guides 252. Flow guide supports 270 can be provided on each of inner diameter portions 254A, 256A, and 248A and outer diameter portions 254B, 256B, and 258B. Any number of flow guide supports 270 may be used to support the charged flow guides 252. Flow guide supports 270 can include a rod 272 anchored to first charged flow guide 254 and second charged flow guide 256 via end caps 274. Spacers 276 surrounding rod 272 can be located between the charged flow guides 254, 256, and 258 to support the charged flow guides 256 and 258 relative to first charged flow guide 254. The present embodiment shows two spacers 276 in the flow guide supports 270; however, any number of spacers 276 can be used for any number of charged flow guides 252. Each spacer of spacers 276 can be a singular tubular body or can be formed of tubular segments. At least one of rod 272, end caps 274, and spacers 276 is electrically conductive to electrically couple the charged flow guides 252 to each other and allow all the charged flow guides 252 to carry a positive electric charge.

Controller 206 is connected to power supply 204 to control a supply of power to charged flow guides 252. Power supply 204 is electronically coupled to at least one of the charged flow guides 252. Power supply 204 can be a power source external or internal to the engine and can be, for example, a battery or generator. Turning power supply 204 on results in power supply 204 supplying the charged flow guides 252 with a positive electric charge. Turning power supply 204 off stops the flow of positive electric charge from the power supply 204 to the charged flow guides 252. Generally, whenever gas turbine engine 10 is running, power supply 204 can be on to supply power to the electrostatic particulate matter collector 250 to capture particulate matter before entering combustor 16. However, controller 206 can be used to turn power supply 204 on or off as a function of operating conditions of gas turbine engine 10 regardless of whether gas turbine engine 10 is running. For example, power supply 204 may be configured to only run when gas turbine engine 10 is in high particulate matter environments and may be disabled otherwise. High particulate matter environments can include, for example, ground or low altitude operations or geographic areas with high particulate matter concentrations. As a result, operation of power supply 204 may be governed, for example, by aircraft altitude and may be limited to the beginning and end of a flight plan.

Combustor section 15 intakes air from the compressor via pre-diffuser 220. Generally, air flows from the forward or upstream end to the aft or downstream end along engine axis A. Arrows 202 indicate the general flow of air through combustor section 15. Air flows from pre-diffuser 220 through the charged flow guides 252 and into combustor dome 234 before entering combustor chamber 230. Air also flows around and between the charged flow guides 252 and then along combustor liner 232 where air can enter combustor chamber 230 through holes 262 in combustor liner 232 or flow past combustor liner 232 and enter the turbine section 18. Air flowing along combustor liner 232 and through holes 262 in combustor liner 232 can be used for cooling of combustor chamber 230. If air flowing through combustor section 15 contains particulate matter, it can stick to combustor liner 232 and combustor dome 234, clogging holes 262 in combustor liner 232 and therefore reducing the cooling effectiveness of the combustor materials.

As previously discussed, air and other particulate matter entering combustor section 15 from compressor section 14 is negatively charged. With power supply 204 turned on and the charged flow guides 252 carrying a positive electric charge, as air flows by the charged flow guides 252, negatively charged particulate matter in the air is attracted to the positively charged flow guides 252 and becomes stuck to the charged flow guides 252. Relative polarity of the charged flow guides 252 and air or particulate matter passing through them may vary. As a result of particulate matter becoming stuck to the charged flow guides, less particulate matter reaches combustor 16, less particulate matter clogs the holes 262 in combustor liner 232, and there are less adverse effects on cooling as a result of particulate matter in the combustor section.

Traditional means of preventing particulate matter from entering the combustion section involve the use of screens with variously sized holes to block and trap particles. Screens with smaller holes are effective at blocking smaller particles, however they result in a greater loss of airflow in the combustor section, also known as head loss. Screens with larger holes will result in reduced head loss but only block larger particles and allow more particulate matter to reach the combustor section. Use of the electrostatic particulate matter collector 250 provides the advantage of not causing significant head loss while still preventing particulate matter from reaching combustor 16. As a result, the holes 262 in combustor liner 232 can be designed to be a greater variety of sizes and a wider selection of materials can be used in the construction of the combustor as a result of not having to design around particulate matter buildup.

FIG. 2 depicts an electrostatic particulate matter collector 250 with three charged flow guides 252. However, the number of charged flow guides 252 can vary from one charged flow guide 252 to any number of charged flow guides 252 suitable for collecting and retaining particulate matter while providing air flow to combustor 16. Among other factors, the number of charged flow guides may depend on available space between pre-diffuser 220 and combustor dome 234. The charged flow guides 252 may vary in size relative to each other and may be spaced at non-standard intervals. The forward and aft axial extents of the charged flow guides 252 may vary in disposition relative to each other. The present embodiment is not intended to limit the size, number, or placement of charged flow guides 252 relative to each other. The charged flow guides 252 can be electrically isolated from other components of the combustor section 15 by air gaps or other forms of insulation such as insulating materials.

The electrostatic particulate matter collector 250 of FIG. 2 is not limited in its implementation to annular combustors as described herein. The disclosed electrostatic particulate matter collector 250 can be adapted for use with can-type and can-annular-type combustors. In can and can-annular-type combustors, each combustor may have its own electrostatic particulate matter collector 250. As a result, the charged flow guides 252 may not be annular around engine axis A, but rather along an axis of the combustor or the pre-diffuser.

FIG. 2 depicts combustor 16 with a combustor chamber 230 defined by combustor liner 232 and combustor dome 234. However, it should be understood that the exterior of the combustor 16 may be defined by a single piece, or any combination of pieces. Combustor liner 232 and combustor dome 234 should not be interpreted as limiting to the construction of the combustor 16.

Figure 3:
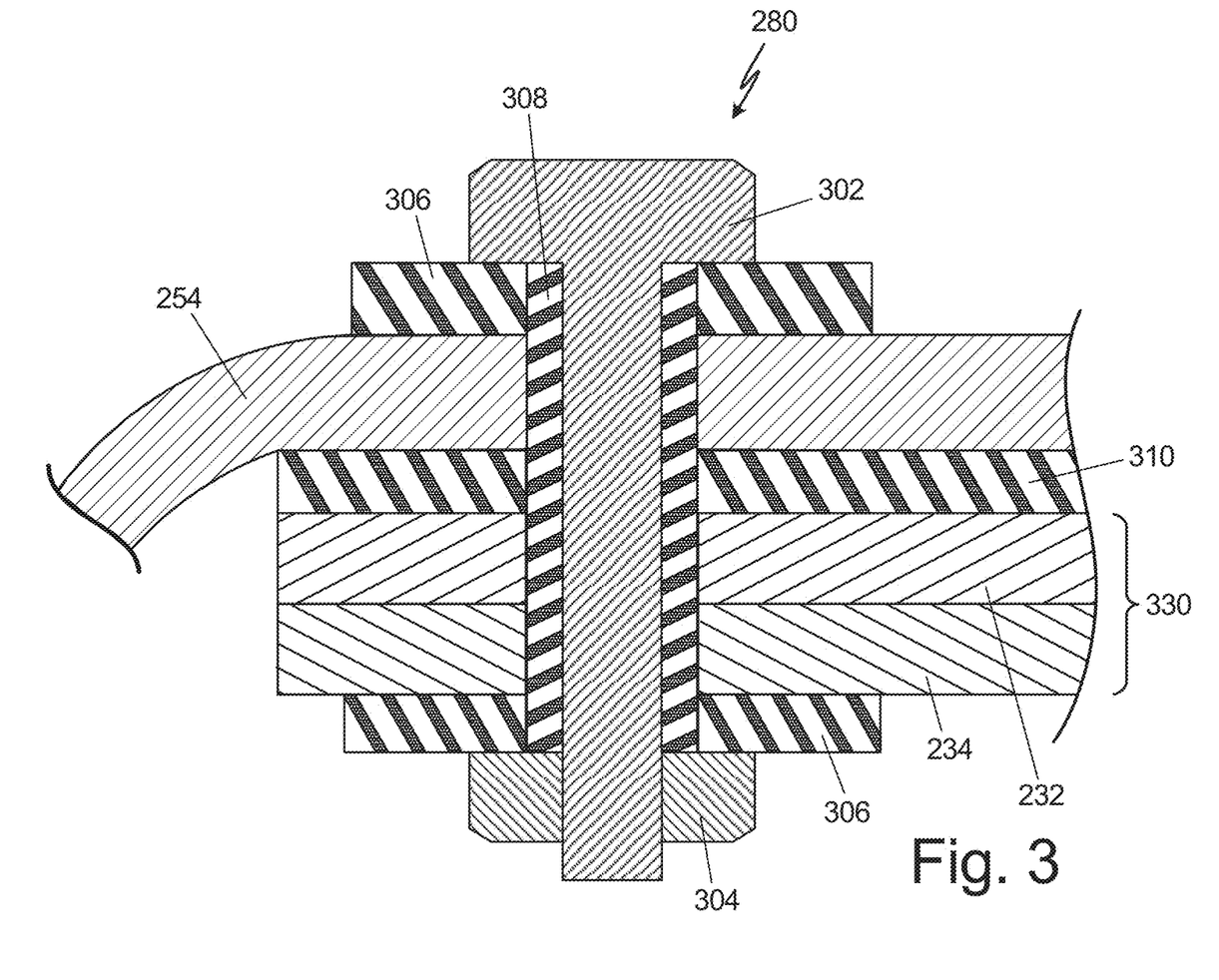
FIG. 3 is a simplified close-up cross-sectional view of a portion of the combustor section of FIG. 2, illustrating attachment of the electrostatic particulate matter collector.

FIG. 3 is a simplified close-up cross-sectional view of a portion of the combustor section of FIG. 2, illustrating a mounting system 280 attaching first charged flow guide 254 to combustor portion 330. In the present case, combustor portion 330 includes combustor liner 232 and combustor dome 234. Mounting system 280 includes a fastener 302, an insulating sleeve 308, insulating washers 306, and an insulating layer 310. Fastener 302 can be a bolt with nut 304 as illustrated in FIG. 3 or any suitable fastening mechanism known in the art. Insulating washers 306, insulating sleeve 308, and insulating layer 310 can be made of a ceramic or any other electrically insulating material suitable for use in the combustor section 15.

Fastener 302 is used to attach and fix first charged flow guide 254 to a portion of the combustor 16, in this case combustor liner 232 and combustor dome 234. An insulating washer 306 can be placed between a head of the fastener 302 and first charged flow guide 254 and another insulating washer 306 can be placed between nut 304 and combustor dome 234. Insulating sleeve 308 can at least partially surround a rod portion of fastener 302. Insulating sleeve 308 and insulating washers 306 serve to electrically isolate first charged flow guide 254 from fastener 302 and in turn combustor liner 232 and combustor dome 234. Insulating layer 310 can be placed between first charged flow guide 254 and combustor liner 232. Insulating layer 310 serves to separate first charged flow guide 254 from combustor dome 234 or combustor liner 232 thus electrically isolating combustor dome 234 and combustor liner 232 from first charged flow guide 254.

It should be noted that elements and dimensions shown in FIG. 3 are not drawn to scale. The relative sizing of the elements may be different. The dispositions of the elements relative to each other are not understood to be limited by what is shown in FIG. 3 and may vary.

FIG. 3 depicts multiple layers of insulation serving to isolate the electric charge of first charged flow guide 254 from combustor 16. However, the number of insulating materials should not be understood as limiting. FIG. 3 also depicts fixing first charged flow guide 254 to the combustor dome 234 and combustor liner 232, however it should be understood that first charged flow guide 254 may be fixed to any combination of the combustor dome 234 or combustor liner 232 or to any casing of the combustor 16.

Figure 4:
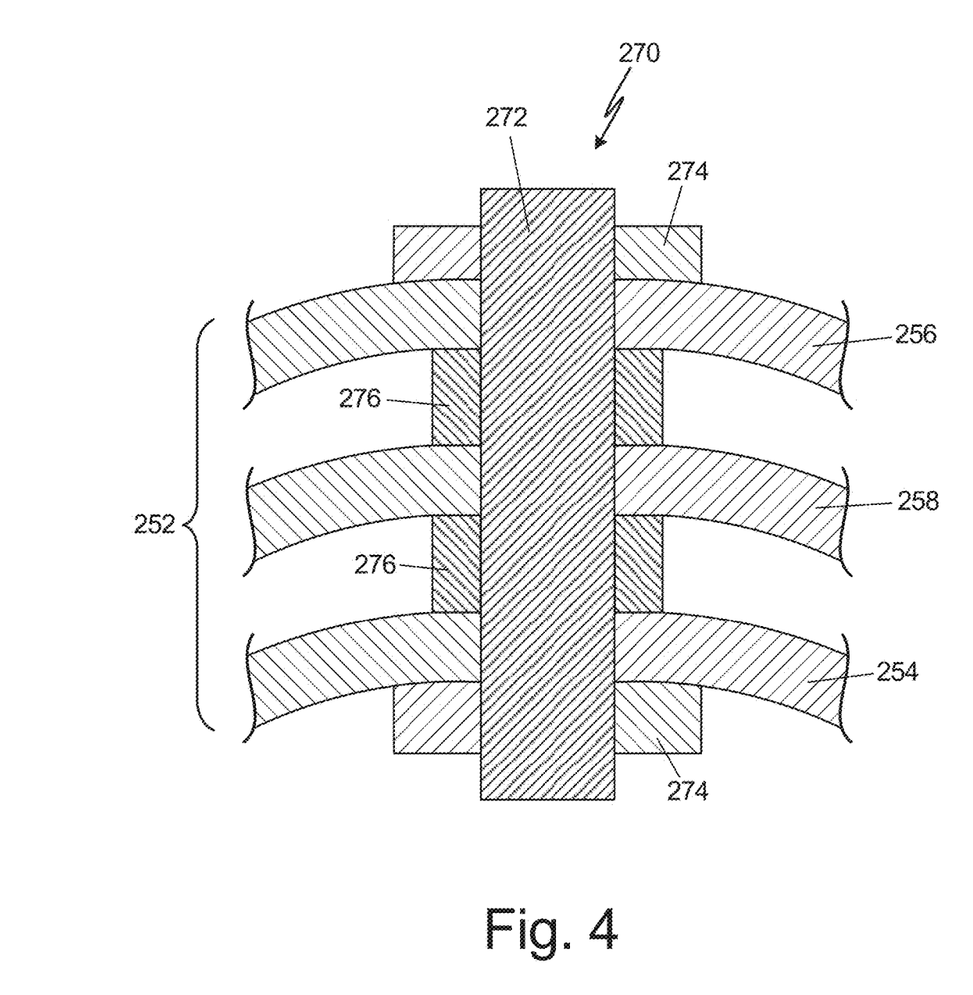
FIG. 4 is a cross-sectional view of a flow guide support of the electrostatic particulate matter collector.

FIG. 4 is a cross-sectional view illustrating flow guide support 270 of the electrostatic particulate matter collector 250. Flow guide support 270 is shown with relation to first charged flow guide 254, second charged flow guide 256, and third charged flow guide 258. Flow guide support 270 can include a rod 272, two end caps 274, and spacers 276. Rod 272 extends through the charged flow guides 252. End caps 274 are located on either end of rod 272, fixing rod 272 to first charged flow guide 254 and second charged flow guide 256. Spacers 276 surround rod 272 and are located between each of the charged flow guides 252. Spacers 276 can be tubular and configured to receive rod. In the present embodiment spacers 276 are placed between second charged flow guide 256 and third charged flow guide 258 and third charged flow guide 258 and first charged flow guide 254. Spacers 276 serve to support second charged flow guide 256 and third charged flow guide 258 relative to first charged flow guide 254. Any combination of rod 272, end caps 274, and spacers 276 can be electrically conductive to allow the charged flow guides 252 to be electrically coupled to each other and thereby also power supply 204. Flow guide support 270 serves to support the charged flow guides 252 relative to first charged flow guide 254 which is fixed to combustor dome 234 and/or combustor liner 232 and to electrically couple the charged flow guides 252.

FIG. 4 depicts two spacers 276, one between each charged flow guides 252. The number of spacers 276 is not understood to be limiting. There may be any number of spacers 276 used. FIG. 4 depicts three charged flow guides 252. However, the number of charged flow guides 252 is not understood to be limiting. Any number of charged flow guides 252 may be held together with flow guide support 270.

The configuration of flow guide support 270 is not limited to that shown in FIG. 4. Any suitable structure may be used to separate charged flow guides 252 while electrically coupling charged flow guides 252. For example, rod 272 and end caps 274 of the flow guide support 270 may be a bolt and a nut. Any part or all of rod 272 may be threaded. Spacers 276 may be fixed to rod 272 via threading, welding, or preforming.

The disclosed electrostatic particulate matter collector and variations thereof as described herein can be installed in a combustor section of gas turbine engine to collect particulate matter on charged flow guides upstream of the combustion chamber. The disclosed electrostatic particulate matter collector can thereby help mitigate adverse consequences of particulate matter interacting with the combustor and turbine, including, for example, material degradation and a reduction in cooling capacity. Use of the disclosed electrostatic particulate matter collector can improve cooling efficiency and increase the lifetime of the components.

DISCUSSION OF POSSIBLE EMBODIMENTS

The following are non-exclusive descriptions of possible embodiments of the present invention.

One embodiment of the present invention includes a gas turbine engine combustor section that extends axially from a pre-diffuser at a forward end to an aft end relative to an engine axis. The gas turbine engine combustor section includes a combustor liner, a combustor dome, an electrostatic particulate matter collector, a fuel nozzle, and a power supply. The combustor liner defines a combustion chamber. The combustor dome is situated at a forward end of the combustor liner and is affixed thereto. The electrostatic particulate matter collector includes a first charged flow guide. The first charged flow guide has an axially forward-most extent aligned with the pre-diffuser and widens radially, with respect to the engine axis, from the forward-most extent to the combustor dome.

The gas turbine engine combustor of the preceding paragraph can optionally include, additionally, and/or alternatively, any one or more of the following features, configurations and/or additional components:

A further embodiment of the foregoing gas turbine engine combustor section, wherein the electrostatic particulate matter collector further comprises a second charged flow guide extending axially forward of the first charged flow guide and radially wider than the first charged flow guide.

A further embodiment of the foregoing gas turbine engine combustor section, wherein the second charged flow guide has an axially forward edge aligned with but not abutting the pre-diffuser, such that an electrically isolating air gap is formed therebetween.

A further embodiment of the foregoing gas turbine engine combustor section, wherein the electrostatic particulate matter collector further comprises a third charged flow guide situated between and spaced apart from the first and second charged flow guides.

A further embodiment of the foregoing gas turbine engine combustor section, wherein the electrostatic particulate matter collector further comprises a plurality of flow guide supports configured to structurally support the second charged flow guide relative to the first charged flow guide, and to electrically couple the second charged flow guide to the first charged flow guide.

A further embodiment of the foregoing gas turbine engine combustor section, wherein each flow guide support of the plurality of flow guide supports comprises: a rod anchored to each of the first and second charged flow guides; and a spacer surrounding the rod and supporting the second charged flow guide relative to the first charged flow guide; wherein at least one of the rod and the spacer is electrically conductive.

A further embodiment of the foregoing gas turbine engine combustor section, wherein the combustor liner and/or combustor dome supports the electrostatic particulate matter collector via a portion of the first charged flow guide concentric with and anchored to at least one of the combustor liner and the combustor dome.

A further embodiment of the foregoing gas turbine engine combustor section, wherein the first charged flow guide is anchored via a mounting system comprising: a plurality of fasteners distributed about first charged flow guide and securing the first charged flow guide to at least one of the combustor dome and the combustor liner, each fastener electrically isolated from the first charged flow guide by an insulating washer.

A further embodiment of the foregoing gas turbine engine combustor section, wherein the mounting system further comprises: an insulating layer disposed between the first charged flow guide and the combustor dome or the first charged flow guide and the combustor liner.

A further embodiment of the foregoing gas turbine engine combustor section, wherein the first charged flow guide and the combustor liner are annular.

Another embodiment of the present invention includes an electrostatic particulate matter collector for retaining particulate matter along a flow path between a pre-diffuser and a combustor liner of a gas turbine engine combustor section. The electrostatic particulate matter collector includes a first charged flow guide, a power supply, a hole in the first charged flow guide, and a mounting system. The first charged flow guide widens radially from an upstream extent to a downstream extent, relative to the flow path. The power supply is electrically coupled to the first charged flow guide such that the first charged flow guide is able to be positively charged by the power supply. The hole in the first charged flow guide is configured to allow a fuel nozzle to pass through. The mounting system is configured to electrically isolate the first charged flow guide from, but structurally secure the first charged flow guide to the combustor liner.

The electrostatic particulate matter collector of the preceding paragraph can optionally include, additionally, and/or alternatively, any one or more of the following features, configurations and/or additional components:

A further embodiment of the foregoing electrostatic particulate matter collector, further comprising a second charged flow guide extending further upstream, relative to the flow path, from the first charged flow guide and radially wider than the first charged flow guide.

A further embodiment of the foregoing electrostatic particulate matter collector, wherein the electrostatic particulate matter collector further comprises a third charged flow guide situated between and spaced apart from the first and second charged flow guides.

A further embodiment of the foregoing electrostatic particulate matter collector, wherein the electrostatic particulate matter collector further comprises a plurality of flow guide supports configured to structurally support the second charged flow guide relative to the first charged flow guide, and to electrically couple the second charged flow guide to the first charged flow guide.

A further embodiment of the foregoing electrostatic particulate matter collector, wherein each flow guide support of the plurality of flow guide support comprises: a rod anchored to each of the first and second charged flow guides; and a spacer surrounding the rod and supporting the second charged flow guide relative to the first charged flow guide; wherein at least one of the rod and the spacer is electrically conductive.

A further embodiment of the foregoing electrostatic particulate matter collector, wherein the first charged flow guide is configured to extend to at least partially overlap the combustor liner.

A further embodiment of the foregoing electrostatic particulate matter collector, wherein the mounting system comprises a plurality of fastener distributed about the first charged flow guide and securing the first charged flow guide to at least one of a combustor dome and the combustor liner, each fastener electrically isolated from the first charged flow guide by an insulating washer.

A further embodiment of the foregoing electrostatic particulate matter collector, wherein the fasteners are configured to be at least partially surrounded by an electrically insulating sleeve.

A further embodiment of the foregoing electrostatic particulate matter collector, wherein the mounting system comprises an insulating layer disposed between the first charged flow guide and the combustor dome or the combustor liner.

A further embodiment of the foregoing electrostatic particulate matter collector, wherein a controller is connected to the power supply for controlling an on or off state on the power supply as a function of operating conditions of the gas turbine engine.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine combustor section extending axially from a pre-diffuser at a forward end to an aft end relative to an engine axis, the gas turbine engine combustor section comprising:
   a combustor liner defining a combustion chamber;
   a combustor dome situated at a forward end of the combustor liner and affixed thereto;
   an electrostatic particulate matter collector comprising a first charged flow guide having an axially forward-most extent aligned with the pre-diffuser, and widening radially with respect to the engine axis from the axially forward-most extent to the combustor dome;

a fuel nozzle extending through the first charged flow guide into the combustor dome; and
   a power supply electrically coupled to positively charge the first charged flow guide.

2. The gas turbine engine combustor section according to claim 1, wherein the electrostatic particulate matter collector further comprises a second charged flow guide extending axially forward of the first charged flow guide and radially wider than the first charged flow guide.

3. The gas turbine engine combustor section according to claim 2, wherein the second charged flow guide has an axially forward edge aligned with but not abutting the pre-diffuser, such that an electrically isolating air gap is formed therebetween.

4. The gas turbine engine combustor section according to claim 2, wherein the electrostatic particulate matter collector further comprises a third charged flow guide situated between and spaced apart from the first and second charged flow guides.

5. The gas turbine engine combustor section according to claim 2, wherein the electrostatic particulate matter collector further comprises a plurality of flow guide supports configured to structurally support the second charged flow guide relative to the first charged flow guide, and to electrically couple the second charged flow guide to the first charged flow guide.

6. The gas turbine engine combustor section according to claim 5, wherein each flow guide support of the plurality of flow guide supports comprises:
   a rod anchored to each of the first and second charged flow guides; and
   a spacer surrounding the rod and supporting the second charged flow guide relative to the first charged flow guide;
   wherein at least one of the rod and the spacer is electrically conductive.

7. The gas turbine engine combustor section according to claim 1, wherein the combustor liner and/or combustor dome supports the electrostatic particulate matter collector via a portion of the first charged flow guide concentric with and anchored to at least one of the combustor liner and the combustor dome.

8. The gas turbine engine combustor section according to claim 7, wherein the first charged flow guide is anchored via a mounting system comprising:
   a plurality of fasteners distributed about first charged flow guide and securing the first charged flow guide to at least one of the combustor dome and the combustor liner, each fastener electrically isolated from the first charged flow guide by an insulating washer.

9. The gas turbine engine combustor section according to claim 8, wherein the mounting system further comprises:
   an insulating layer disposed between the first charged flow guide and the combustor dome or the first charged flow guide and the combustor liner.

10. The gas turbine engine combustor section according to claim 1, wherein the first charged flow guide and the combustor liner are annular.

11. An electrostatic particulate matter collector for retaining particulate matter along a flow path between a pre-diffuser and a combustor liner of a combustor section of a gas turbine engine, the electrostatic particulate matter collector comprising:
   a first charged flow guide widening radially from an upstream extent to a downstream extent, relative to the flow path;
   a power supply electrically coupled to the first charged flow guide such that the first charged flow guide is able to be positively charged by the power supply;
   a hole in the first charged flow guide configured to allow a fuel nozzle to pass through; and
   a mounting system configured to electrically isolate the first charged flow guide from, but structurally secure the first charged flow guide to, the combustor liner.

12. The electrostatic particulate matter collector according to claim 11, further comprising a second charged flow guide extending further upstream, relative to the flow path, from the first charged flow guide and radially wider than the first charged flow guide.

13. The electrostatic particulate matter collector according to claim 12, wherein the electrostatic particulate matter collector further comprises a third charged flow guide situated between and spaced apart from the first and second charged flow guides.

14. The electrostatic particulate matter collector according to claim 12, wherein the electrostatic particulate matter collector further comprises a plurality of flow guide supports configured to structurally support the second charged flow guide relative to the first charged flow guide, and to electrically couple the second charged flow guide to the first charged flow guide.

15. The electrostatic particulate matter collector according to claim 12, wherein each flow guide support of the plurality of flow guide support comprises:
   a rod anchored to each of the first and second charged flow guides; and
   a spacer surrounding the rod and supporting the second charged flow guide relative to the first charged flow guide;
   wherein at least one of the rod and the spacer is electrically conductive.

16. The electrostatic particulate matter collector according to claim 11, wherein the first charged flow guide is configured to extend to at least partially overlap the combustor liner.

17. The electrostatic particulate matter collector according to claim 11, wherein the mounting system comprises a plurality of fasteners distributed about the first charged flow guide and securing the first charged flow guide to at least one of a combustor dome and the combustor liner, each fastener electrically isolated from the first charged flow guide by an insulating washer.

18. The electrostatic particulate matter collector according to claim 17, wherein each of the plurality of fasteners are configured to be at least partially surrounded by an electrically insulating sleeve.

19. The electrostatic particulate matter collector according to claim 17, wherein the mounting system comprises an insulating layer disposed between the first charged flow guide and the combustor dome or the combustor liner.

20. The electrostatic particulate matter collector according to claim 11, wherein a controller is connected to the power supply for controlling an on or off state on the power supply as a function of operating conditions of the gas turbine engine.

* * * * *